United States Patent
Burcin et al.

[15] 3,682,501
[45] Aug. 8, 1972

[54] FLEXIBLE COUPLING

[72] Inventors: Robert J. Burcin, Madison, N.J.; Orville L. Johnson, San Jose, Calif.; Rene P. Mouton, Nederland, Tex.

[73] Assignee: Foster Wheeler Corporation, Livingston, N.J.

[22] Filed: Dec. 14, 1970

[21] Appl. No.: 97,633

[52] U.S. Cl. .................285/114, 285/229, 285/235
[51] Int. Cl. ................................................F16l 51/02
[58] Field of Search.......285/114, 229, 235, 236, 226

[56] References Cited

UNITED STATES PATENTS

| | | | |
|---|---|---|---|
| 3,473,828 | 10/1969 | Pearson | 285/229 X |
| 1,639,225 | 8/1927 | Grace | 285/236 |
| 2,300,135 | 10/1942 | Rice | 285/236 X |
| 3,164,401 | 1/1965 | Fawkes | 285/229 |
| 582,575 | 5/1897 | Bayles | 285/229 |
| 2,490,333 | 12/1949 | Basham | 285/114 X |
| 2,341,066 | 2/1944 | Wiederkehr | 285/114 X |
| 2,451,438 | 10/1948 | Hartman | 285/236 |

FOREIGN PATENTS OR APPLICATIONS

| | | | |
|---|---|---|---|
| 569,076 | 1/1924 | France | 285/229 |
| 350,069 | 3/1922 | Germany | 285/236 |

*Primary Examiner*—Thomas F. Callaghan
*Attorney*—John Maier, III, Marvin A. Naigur and John E. Wilson

[57] ABSTRACT

A flexible coupling is provided for joining the ends of two cylindrical conduits in flow communication for the purpose of conveying fluids under pressure. The body of the coupling is inflated by the pressurized fluid such that the opposite sides of the coupling are forced against the end of the conduits.

2 Claims, 3 Drawing Figures

PATENTED AUG 8 1972

3,682,501

FLEXIBLE COUPLING

BACKGROUND OF THE INVENTION

In the operation of large chemical plants and petroleum refineries, it is necessary to provide conduit or piping systems for conveying fluids under pressure between the various operating units, as well as connections for pumps in the systems. When it is necessary to utilize a complex piping arrangement, it is very difficult to bring several sections of the pipe together into a common junction in precise alignment. Accordingly, it has been common practice in the past to place relatively complex expansion joints in the conduit for joining together the misaligned sections in order to bring the ends together at a common point. These complex expansion joints require special designs, which often result in several months' time before delivery can be made. A typical situation involving the critical alignment of conduits is the use of large water pumps in a chemical refinery, in which the inlet and outlet of the pump must be brought into perfect alignment with the ends of the piping system to which it is joined. Also, since the equipment is relatively large and constructed at ground level on foundations, settling may occur thereby creating stress. In accordance with the present invention, a flexible coupling has been provided for joining the ends of a conduit together and compensate for any vertical or horizontal displacement due to the misalignment and settlement of the ends of the conduits at the points to which they are joined. This flexible coupling can be used as a permanent connection or as a temporary connection until a special expansion joint can be obtained. In this manner it is possible to take account for various unexpected displacements occurring in a conduit system.

SUMMARY OF THE INVENTION

In accordance with an illustrative embodiment demonstrating features and advantages of the present invention, there is provided a flexible coupling to join the ends of cylindrical conduits in flow communication for conveying fluid under pressure. The coupling comprises an annular shaped, hollow body section formed from a flexible material. The body section has a central opening defined by opposing circular beads. A pair of annular shoulders are formed on the ends of the conduits. Thus, the fluid under pressure will inflate the body section and force the circular beads against the annular shoulders.

BRIEF DESCRIPTION OF THE DRAWINGS

The above brief description as well as further objects, features, and advantages of the present invention will be more fully appreciated by reference to the following detailed description of a presently preferred but nonetheless illustrative embodiments in accordance with the present invention when taken in connection with the accompanying drawings wherein.

DESCRIPTION OF THE PREFERRED EMBODIMENT

Figure 1:
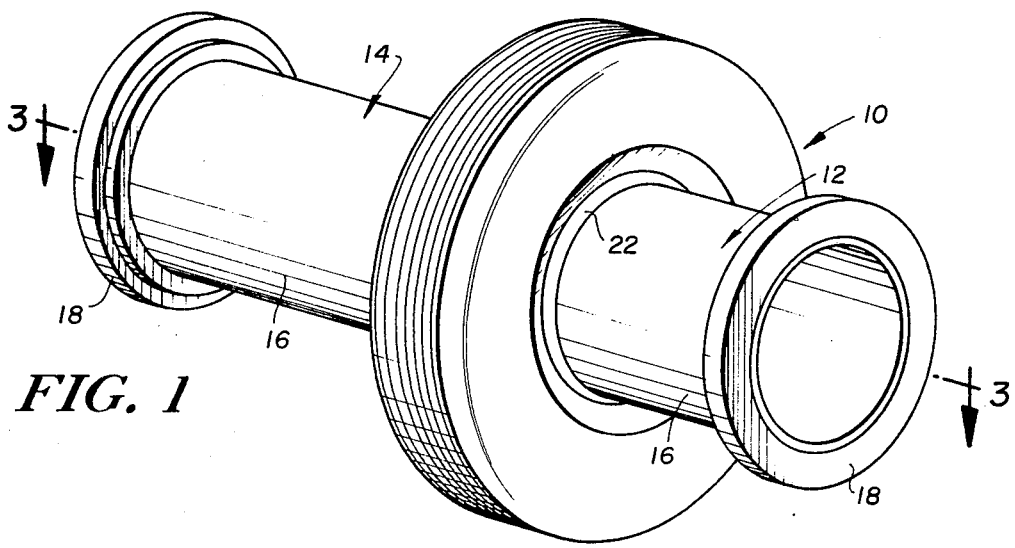
FIG. 1 is a perspective view of two conduit sections joined together by a flexible coupling in accordance with the present invention.

With reference to FIG. 1, in accordance with the present invention, there is provided a flexible coupling generally designated by the reference numeral 10 for joining together conduits 12 and 14. The conduits 12 and 14 are of a similar configuration, and the same reference numerals will be used to define corresponding portions thereof. Accordingly, the conduits 12 and 14 are of a general cylindrical form which is defined by cylindrical walls 16 having outlet connections 18. Opposite the outlet connections 18, the cylindrical walls 16 are formed with coupling openings 20. On the of portion of cylindrical wall 16, adjacent the coupling openings 20 there are provided shoulders 22 which are mounted in opposing relation on the outer surface of cylindrical wall 16. The shoulders 22 are formed from annular shaped rings that are welded to the walls 16 of conduits 12 and 14, respectively. The conduits 12 and 14 are mechanically joined together by a series of brace bars 24 which are welded along the inner portions of cylindrical wall In across the coupling openings 20. Thus, the conduits 12 and 14 are mechanically connected together by the brace bars 24, the coupling openings 20 being slightly spaced apart from each other to form an expansion space, which has been designated 26. It should be understood that the brace bars 24 are formed from a flexible material in order to allow the outer connections 18 to be connected in proper alignment.

Figure 2:
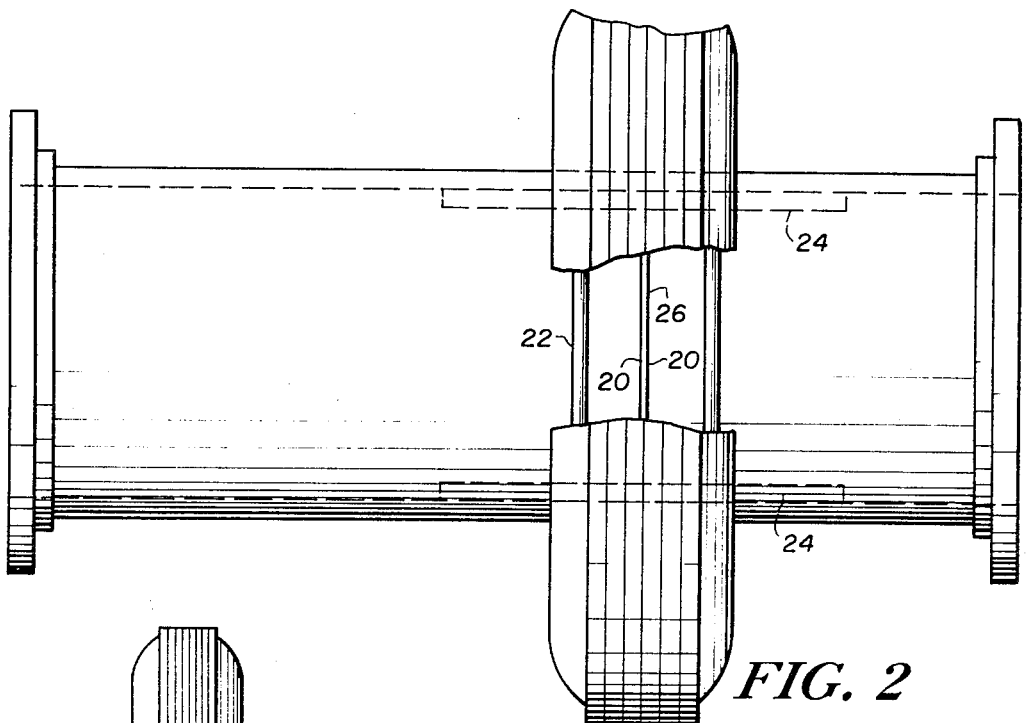
FIG. 2 is an enlarged front elevational view of the conduits and couplings shown in FIG. 1, with portions being broken away to better show the manner in which the conduits are joined together.
Figure 3:
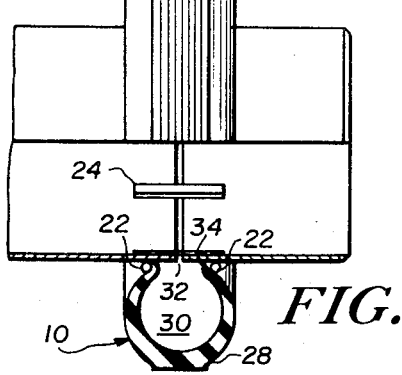
FIG. 3 is a partial sectional view taken along the line 3—3 of FIG. 1, and looking in the direction of the arrows.

The flexible coupling 10 is comprised of an annular body section 28 which forms an internal sealing chamber 30. The sealing chamber 30 has a cylindrical opening 32 which is defined by a pair of spaced apart beads 34 located at the end extremities of the body section 28. Depending on the size of the conduits 12 and 14, it may be possible to utilize a standard automobile or truck size tire for the coupling 10, but when the outer diameters of the conduits 12 and 14 are different than the inner diameter of standard size automobile or truck tires, it may be necessary to specially fabricate the coupling 10 to conform with the dimensions of the conduit system being joined together. In the general operation of the conduit system, the conduits 12 and 14 are generally brought into alignment after the outlets 18 have been first connected to refinery equipment such as a cooling tower and pump arrangement, with the outer ends 20 positioned in a spaced apart position to define the expansion space 26 as best shown in FIG. 2. The brace bars 24 are then welded to the interior of wall section 16. In the case of large conduit systems it is possible for an individual welder to go into the conduit and weld the brace bars 24 onto the interior portion of cylindrical wall 16. The coupling 10 is then moved down the wall 16 and forced between the expansion space 26 such that the beads 34 are positioned between the annular shoulders 22. Alternatively, and particularly with respect to relatively small diameter conduits, the flexible coupling 10 can be assembled to the conduits 12 and 14, or shorter sections of conduits 12 and 14, in a shop. This can be accomplished by mounting the coupling 10 onto the conduits 12 and 14 over expansion space 26 and then welding the brace bars 24 to cylindrical wall 16. This shop assembly method contemplates the shipment of the completed lengths of conduits 12 and 14 or shorter sections of each of the conduits 12 and 14. The latter shorter section arrangement would be achieved by cutting the conduits 12 and 14, very close to the openings 20, and later field welding the outer ends which had been cut.

Accordingly, after the assembly operation has been completed, it is then possible to transmit a fluid under pressure through the conduits 12 and 14 such that the fluid will pass through the expansion space 26 into the annular chamber 30 of the coupling 10. In this manner, the body section 28 will inflate and force the circular beads 34 against the shoulders 22, whereby the flexible coupling 10 forms a fluid tight connection between annular chamber 30 and the conduits 12 and 14.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A flexible coupling for joining cylindrical conduits in flow communication for conveying a fluid under pressure, comprising two cylindrical conduits and a body section formed from a flexible material which defines an annular shaped internal housing, said internal housing having a radially extending central opening defined by opposed circular beads having concave outer surfaces, a pair of annular shaped shoulders continuously extending around said ends of said conduits and secured to said conduits to form a pressure-tight seal therewith and said shoulders formed with a circular cross-sectional area, whereby said fluid under pressure will form a fluid tight connection in said internal housing between said cylindrical conduits and said fluid under pressure will inflate said body section and force said concave outer surfaces of said circular beads against and in tight engagement with said shoulders such that the outer end portions of said beads extend axially outwardly beyond the axially innermost surface portions of said shoulders to prevent said beads from moving radially outwardly with respect to said shoulders.

2. A flexible coupling for joining cylindrical conduits in flow communication for conveying a fluid under pressure, comprising two cylindrical conduits, a pair of brace bars mounted to said conduits for mechanically holding said ends in a fixed and spaced apart position, an annular shaped, hollow body section formed from a flexible material, said body section having a U-shaped cross-sectional area with a central opening defined by opposing circular beads having concave outer surfaces located at the end extremities of said body section a pair of shoulders formed on said ends of said conduits and secured to said conduits to form a pressure-tight seal therewith and said shoulders formed with a circular cross-sectional area, whereby said fluid under pressure will form a fluid tight connection in said body section between said cylindrical conduits and said fluid under pressure will inflate said body section and force said concave outer surfaces of said circular beads against and in tight engagement with said annular shoulders such that the outer end portions of said beads extend axially outwardly beyond the axially innermost surface portions of said shoulders to prevent said beads from moving radially outwardly with respect to said shoulders.

* * * * *